(12) United States Patent
Biskeborn

(10) Patent No.: US 7,325,296 B2
(45) Date of Patent: Feb. 5, 2008

(54) METHOD OF FABRICATING A MAGNETIC HEAD

(75) Inventor: Robert Glenn Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 11/133,625

(22) Filed: May 19, 2005

(65) Prior Publication Data

US 2005/0213259 A1 Sep. 29, 2005

Related U.S. Application Data

(62) Division of application No. 10/340,327, filed on Jan. 10, 2003, now Pat. No. 6,930,863.

(51) Int. Cl.
  *G11B 5/127* (2006.01)
  *H04R 31/00* (2006.01)

(52) U.S. Cl. .............. 29/603.14; 29/603.07; 29/603.13; 360/122; 360/126; 360/317; 360/319; 427/127; 427/128

(58) Field of Classification Search .......... 29/603.07, 29/603.13, 603.14; 360/122, 123, 126, 317, 360/319; 427/127, 128
See application file for complete search history.

(56) References Cited

U.S. PATENT DOCUMENTS

| 3,999,216 A | 12/1976 | Berchtold |
| 5,572,392 A | 11/1996 | Aboaf et al. |
| 5,652,015 A | 7/1997 | Aboaf et al. |
| 5,838,521 A | 11/1998 | Ravipati |
| 6,038,106 A | 3/2000 | Aboaf et al. |
| 6,224,719 B1 * | 5/2001 | Westwood ............ 204/192.2 |
| 6,496,335 B2 | 12/2002 | Gill |
| 6,760,198 B2 | 7/2004 | Jarratt |
| 7,068,468 B2 * | 6/2006 | Kamijima ............... 360/128 |

FOREIGN PATENT DOCUMENTS

JP  62156264 A2  7/1987

* cited by examiner

*Primary Examiner*—Paul Kim
(74) *Attorney, Agent, or Firm*—Robert O. Guillot; Intellectual Property Law Offices

(57) ABSTRACT

A magnetic head having a magnetic shield and/or pole layer that is fabricated as a plurality of laminated layers, in which each layer includes a sublayer thickness of Fe(N) and a sublayer thickness of NiFe(N), and where the relative thickness of these two sublayers is graduated. Particularly, the initially deposited laminations include sublayers of NiFe(N) having a thickness that is substantially greater than the thickness of the Fe(N) sublayers, whereas the finally deposited laminations include sublayers having an Fe(N) thickness that is substantially greater than the thickness of the NiFe(N) sublayers.

12 Claims, 2 Drawing Sheets

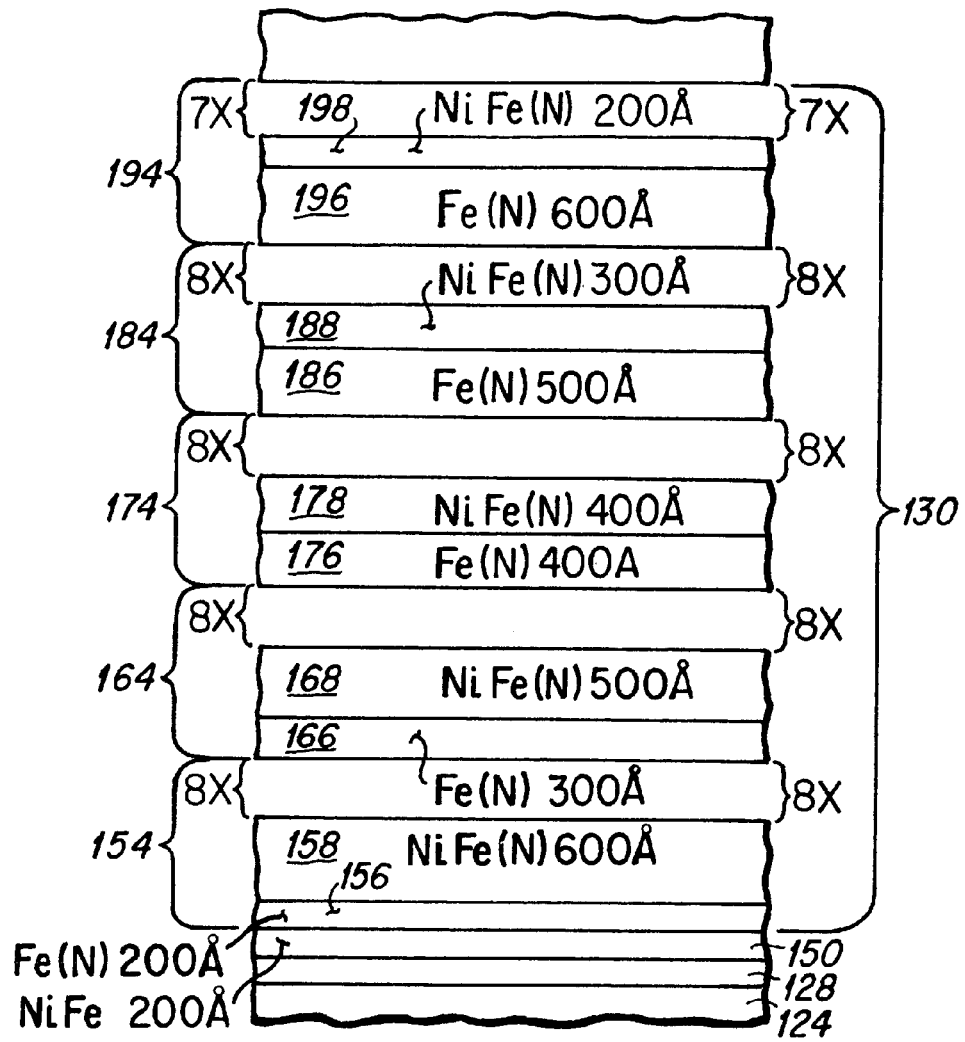
Fig.4
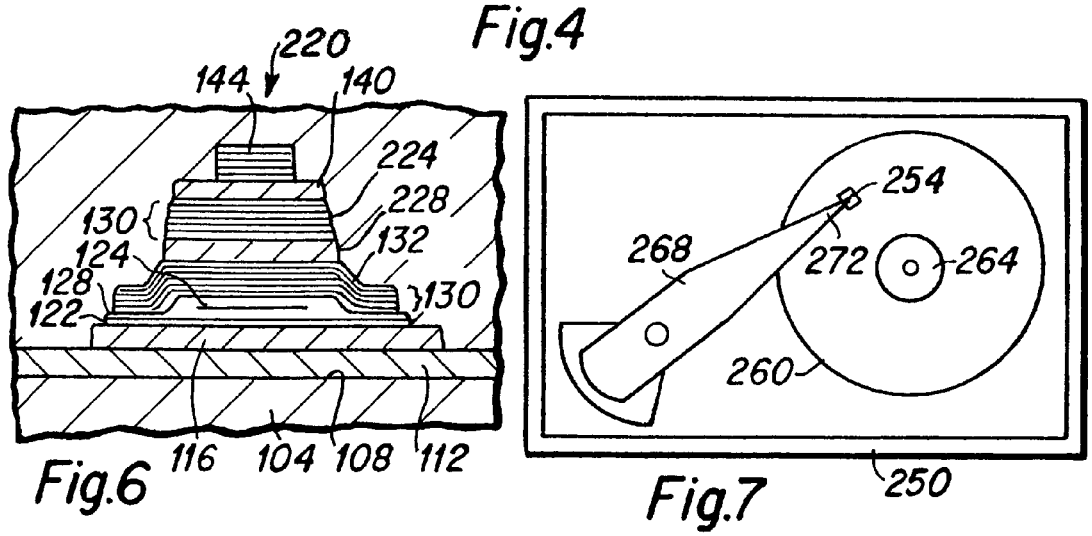
Fig.6
Fig.7

METHOD OF FABRICATING A MAGNETIC HEAD

This is a division of application Ser. No. 10/340,327 filed Jan. 10, 2003, now U.S. Pat. No. 6,930,863.

BACKGROUND OF THE INVENTION

1. Field of the Invention

The present invention relates generally to magnetic shields and magnetic poles for read heads and write heads of magnetic sensors, and more particularly to laminated, nitrided iron, nickel-iron magnetic shields and magnetic poles having a composition gradient.

2. Description of the Prior Art

As is well known to those skilled in the art, the fabrication of magnetic sensors having read head elements and write head elements involves the deposition and shaping of a plurality of thin film layers of various materials utilizing photolithographic, etching and other process steps. The read head elements and write head elements are fabricated on the surface of a substrate base, and after fabrication, the substrate is sliced in such a manner as to create the magnetic sensors. In a typical prior art fabrication process, read head elements and write head elements may be fabricated adjacent to each other and aligned so as to create a linear sensor element of a tape drive head when the fabrication process is complete, or the read head elements and write head elements may be fabricated one on top of the other to form a magnetic head of a hard disk drive.

The focus of the present invention is upon the fabrication and composition of the magnetic shields of the read head element and the magnetic poles of the write head elements, and the present invention relates to improvements in the process for fabricating the shield or pole components.

Regarding the magnetic shield layer, it is known in the prior art that where the layer is composed of Permalloy that it will have superior magnetic shielding properties, however this material is quite ductile and metal bridging problems are known to occur during head polishing and with wear from usage that can result in electrical shorting by the Permalloy across an insulation layer to the MR sensor elements. It is likewise known in the prior art that where the magnetic shield layer is composed of Fe, that a harder, less ductile layer results in which bridging and electrical shorting is not a problem. However, an Fe shield is less magnetically stable than a Permalloy shield, and additionally, an Fe shield is susceptible to corrosion and degraded performance where a Permalloy shield is not. A prior art shield that resolves some of these problems involves the fabrication of a laminated shield, in which alternating thin film layers of Permalloy and Fe are sequentially deposited. Additionally, to further improve the properties of the prior art laminated shield, the layers are nitrided as they are deposited. A specific laminated, nitrided shield layer of the prior art includes an Fe(N) 600 Å, NiFe(N) 200 Å laminated layer, which this two sublayer lamination is repeated a plurality of times to create the shield layer. As is described hereinbelow, the present invention involves an improvement in such laminated layers, in which a composition gradient is employed, such that the laminated layer structure provides superior magnetic shield properties at the read head element location and superior P1 magnetic pole properties at the write head element location.

SUMMARY OF THE INVENTION

The present invention includes tape recording heads and hard disk drive magnetic heads having improved read head and write head elements. The improvements in the read heads and write heads relate to the fabrication of an improved layer that functions both as a magnetic shield of the read head and/or a magnetic pole of the write head.

In a preferred embodiment of the present invention the shield or pole layer is fabricated as a plurality of laminated layers, in which each layer includes a sublayer thickness of Fe(N) and a sublayer thickness of NiFe(N). The relative thickness of these two sublayers within each lamination layer is graduated to achieve more optimal performance of the layer. Particularly, the initially deposited laminations may include sublayers of NiFe(N) having a thickness that is significantly greater than the thickness of the Fe(N) sublayers, whereas the finally deposited upper laminations of the layer include sublayers having an Fe(N) thickness that is substantially greater than the thickness of the NiFe(N) sublayers. In a particular embodiment described in detail herein, each lamination is approximately 800 Å thick and the laminations that are first deposited are Fe(N) 200 Å, NiFe (N) 600 Å. Subsequent laminations are Fe(N) 300 Å, NiFe(N) 500 Å; Fe(N) 400 Å, NiFe(N) 400 Å; Fe(N) 500 Å, NiFe(N) 300 Å; Fe(N) 600 Å, NiFe(N) 200 Å. Each of these individual laminations may be repeated a plurality of times, such as 9 times, prior to the change in composition of a subsequent series of laminations. Alternatively, the composition of each deposited lamination may be graduated more finely, such as Fe(N) 200 Å in a first lamination, Fe(N) 210 Å in a second lamination, Fe(N) 220 Å in a third lamination, etc. with the thickness of the NiFe(N) lamination decreasing correspondingly. Of course, other lamination layer thicknesses and individual layer thickness gradients are included within the scope of the invention. The gradient composition laminated layer of the present invention results in a read head shield having a generally greater composition of nitrated Permalloy NiFe(N) disposed proximate the read head sensor for improved magnetic shield properties (with sufficient Fe(N) to reduce bridging), and a magnetic pole of the present invention has a relatively increased composition of Fe(N) proximate the write gap of the magnetic head.

It is an advantage of the magnetic head of the present invention that it includes a layer having improved magnetic shield properties and improved magnetic pole properties.

It is another advantage of the magnetic head of the present invention that it includes a layer having a laminated structure with a composition gradient that provides improved magnetic shield properties for the read head and improved magnetic pole properties for the write head.

It is a further advantage of the magnetic head of the present invention that it includes a laminated structure which provides reduced bridging of a Permalloy shield component at the read head together with improved magnetic pole properties at the write head.

It is an advantage of the tape drive of the present invention that it includes a tape head of the present invention having a layer having improved magnetic shield properties and improved magnetic pole properties.

It is another advantage of the tape drive of the present invention that it includes a tape head of the present invention that includes a laminated structure with a composition gradient that provides improved magnetic shield properties for the read head and improved magnetic pole properties for the write head.

It is a further advantage of the tape drive of the present invention that it includes a tape head of the present invention that includes a laminated structure which provides reduced bridging of a Permalloy component at the read head together with improved magnetic pole properties at the write head.

It is an advantage of the magnetic head fabrication process of the present invention that an improved magnetic head is provided through the use of known head fabrication methods, such that no new substances are introduced into the fabrication process.

It is an advantage of the hard disk drive of the present invention that it includes a magnetic head of the present invention having a layer having improved magnetic shield properties and improved magnetic pole properties.

It is another advantage of the hard disk drive of the present invention that it includes a magnetic head of the present invention that includes a laminated structure with a composition gradient that provides improved magnetic shield properties for the read head and improved magnetic pole properties for the write head.

It is a further advantage of the hard disk drive of the present invention that it includes a magnetic head of the present invention that includes a laminated structure which provides reduced bridging of a Permalloy component at the read head together with improved magnetic pole properties at the write head.

These and other features and advantages of the present invention will no doubt become apparent to those skilled in the art upon reading the following detailed description which makes reference to the several figures of the drawing.

IN THE DRAWINGS

The following drawings are not made to scale of an actual device, and are provided for illustration of the invention described herein.

FIG. 4 depicts a plurality of laminated layers of a laminated gradient composition layer of the present invention;

FIG. 6 depicts a piggy back magnetic head that may be used in a tape drive or hard disk drive of the present invention; and FIG. 7 is a schematic depiction of a hard disk drive including a magnetic head of the present invention.

DETAILED DESCRIPTION OF THE PREFERRED EMBODIMENTS

Figure 1:
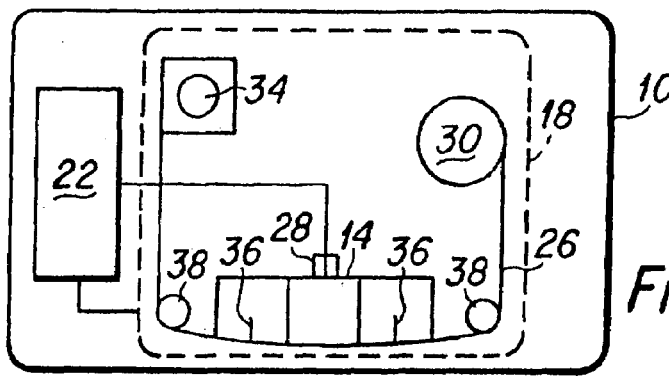
FIG. 1 is a generalized depiction of a magnetic tape drive.

FIG. 1 is a top plan view that generally depicts a magnetic tape drive 10 having a linear tape recording head 14 which provides a general background for the present invention. As depicted in FIG. 1, the magnetic tape drive 10 generally includes at least one magnetic tape recording device 18 with a control unit 22 for controlling the motion of various components of the magnetic tape recording device 18 and for managing the data that is written to or read from the magnetic tape 26 within the magnetic tape recording device. The magnetic tape recording device 18 generally includes the magnetic tape recording head 14 mounted upon an actuator 28, a tape supply reel 30 and a tape take-up reel 34 for transporting the magnetic tape 26 across the head. The head 14 includes two sensor element strips 36 that include a plurality of sensor elements (described herebelow) that function to write data to and read data from the magnetic tape 26. The tape recording device 18 further includes tape movement control devices 38 for controlling the tape as it approaches the head 14.

Figure 2:
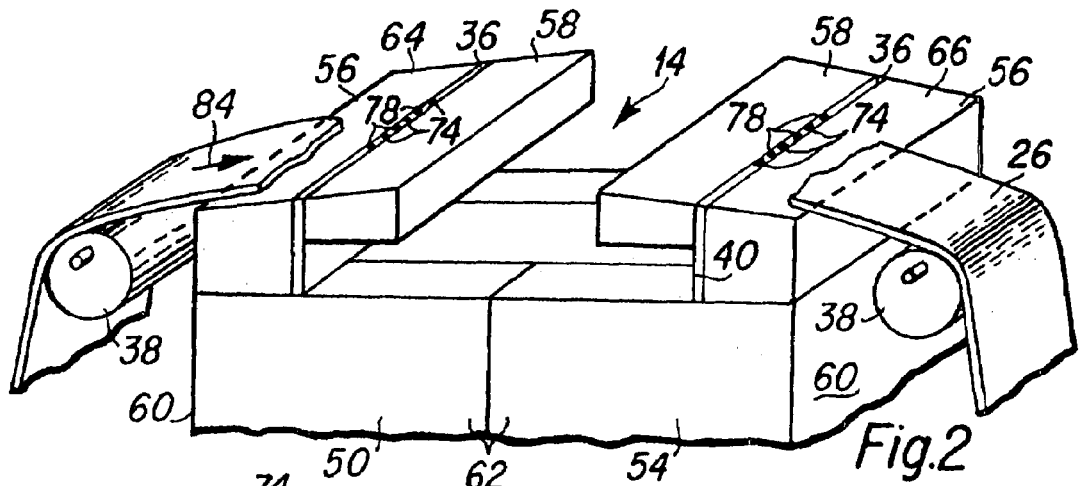
FIG. 2 is a perspective view of one type of tape recording head that includes the novel features of the present invention.

FIG. 2 is a perspective view of a linear tape recording head 14 having a recording tape 26 disposed thereon. The tape recording head 14 depicted in FIG. 2 is a flat contour linear tape recording head that includes a left sensor block element 50 and a right sensor block element 54. Each sensor block 50 and 54 includes a wafer substrate portion 56 having a sensor element strip 36 formed thereon, a cover piece 58 that is bonded to the upper portion of the sensor strip 36 to cover it, and a lower U-shaped base 60 having projecting ends 62. The ends 62 of the base pieces 60 are bonded together utilizing an appropriate adhesive. The present invention is not to be limited to such flat contour linear tape recording heads, and it is applicable to many types of recording heads, as will be understood by those skilled in the art upon reading further.

A plurality of discrete sensor elements 74 and 78 are fabricated in the sensor element strip 36 in the top surface 64 and 66 of each of the left block 50 and right block 54, respectively. In a standard type of tape head, the discrete sensor elements 74 and 78 are formed as read head elements 74 and write head elements 78 that are preferably fabricated in alternating manner within the linear sensor strip 36. Furthermore, the sensor elements 74 and 78 are oppositely disposed with regard to the left sensor block 50 and right sensor block 54. Therefore, when the tape 26 is moving toward the right (see arrow 84), a write element 78 in the left block 50 can write data onto the tape 26 and a read element 74 in right block 54 can subsequently read the data written by the write element 78. Other types of magnetic sensor element designs are known to those skilled in the art, and the present invention may be utilized in such designs, as are described herebelow.

Figure 3:
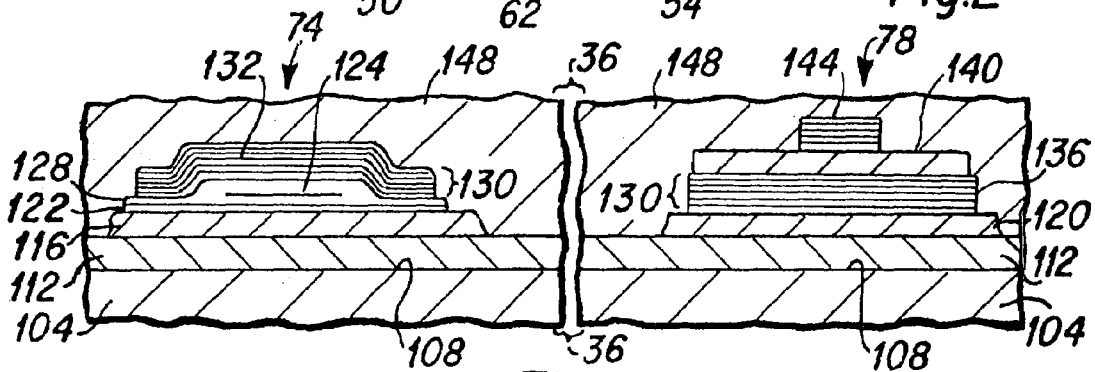
FIG. 3 is a side cross-sectional view depicting adjacent read head and write head elements of a tape head of the present invention.

As is well known to those skilled in the art, the sensor strip 36 is cut from a larger substrate upon which a plurality of such sensor strips are simultaneously fabricated, and FIG. 3 is a side cross-sectional view depicting the fabrication of a portion of a sensor strip upon a substrate 104 that includes a read head element 74 and a write head element 78. As depicted in FIG. 3, a substrate base 104, which may be a wafer composed of a substance such as AlTiC ($Al_2O_3$, Ti, C) has an upper surface 108 upon which a plurality of thin film layers are deposited and fabricated to create the read head and write head elements of the present invention. Initially, an insulation layer 112, typically composed of $Al_2O_3$, is deposited across the surface 108 of the wafer. Thereafter, a discrete read head first magnetic shield (S1) 116 is fabricated upon the insulation layer 112 at each of the read head locations. The S1 shield may be, though not necessarily, comprised of a material such as AlFeSi, that is well known to those skilled in the art. A similar S1 element 120 may be fabricated at the location of the write head element, although it is not necessary to do so.

Following the fabrication of the S1 shield 116 an electrical insulation layer (G1) 122 is deposited and a magnetoresistive (MR) read head sensor element 124 is fabricated in a plurality of process steps upon the G1 insulation layer 122 at the location of each of the read heads. The write head locations are masked such that the G1 layer 122 and MR sensor element layers 124 are not fabricated at the location of the write heads. Following the fabrication of the MR sensor elements 124 another electrical insulation layer (G2) 128 is deposited, and a laminated layer 130 that functions as a second read head magnetic shield (S2) 132 is fabricated upon the G2 insulation layer 128 at the locations of the read head elements. Significantly, the write head mask is removed at the location of the write heads prior to the fabrication of the laminated layer 130, such that the laminated layer 130 is also deposited at the locations of the write heads. In this regard, the laminated layer 130 that is fabricated at the write head locations will function as the first magnetic pole (P1) 136 of the write heads. This laminated layer 130 that functions both as the S2 magnetic shield 132 and P1 magnetic pole 136 is the focus of the present invention, as is described in more detail herebelow, and is referred to herein as the S2 (P1) layer 130.

Following the fabrication of the S2 (P1) layer 130, the read head locations are masked and further layers are deposited and fabricated upon the P1 poles 136 at the write head locations to create the write heads 78, such layers including a write gap layer 140, induction coil layers (not shown) and a second magnetic pole (P2) 144 of the write head 78, as are well known to those skilled in the art. Following the fabrication of the write head components, the read head mask is removed and further fabrication steps are conducted to complete the fabrication and encapsulation 148 of the read head and write head elements. Following further well known fabrication steps the substrate 104 is ultimately sliced into the discrete sensor elements 36 that are subsequently incorporated into the tape recording heads 14 of the present invention.

With regard to the S2(P1) layer 130 of the present invention that is depicted in FIG. 3, it is composed of a plurality of laminated layers having a graded composition that are sequentially deposited to create the S2(P1) layer 130, as is more fully described with the aid of FIG. 4.

FIG. 4 is an enlarged cross-sectional view depicting a preferred lamination structure of the S2/P1 layer 130 of the present invention. As depicted in FIG. 4, a thin film adhesion layer 150, preferably composed of NiFe is deposited. A first laminated layer structure 154 is next deposited upon the adhesion layer 150. The first laminated layer structure 154 includes alternating sublayers of Fe(N) 156 and NiFe(N) 158, where the thickness of the NiFe(N) sublayer 158 is substantially greater than the thickness of the Fe(N) sublayer 156. In the preferred embodiment, the first laminated layer structure 154 has an NiFe(N) sublayer 158 thickness of 600 Å and an Fe(N) sublayer 156 thickness of 200 Å, for a total thickness of 800 Å, and this first laminated layer structure 154 is deposited a plurality of times, such as nine times in the preferred embodiment.

Following the deposition of the first laminated layer structure 154, a second laminated layer structure 164 is deposited that includes a plurality of laminated layers in which each layer is comprised of an Fe(N) sublayer 166 and an NiFe(N) sublayer 168. Significantly, in this second laminated layer structure 164, the thickness of the NiFe(N) sublayers 168 is reduced relative to the thickness of the NiFe(N) sublayers 158 in the first laminated structure 154, and the thickness of the Fe(N) sublayers 166 in the second laminated structure is increased relative to the thickness of the Fe(N) sublayers 156 in the first laminated layer structure 154. As depicted in FIG. 4, in the preferred embodiment, the NiFe(N) sublayer 168 thickness is 500 Å and the Fe(N) sublayer 166 thickness is 300 Å in each lamination of the second laminated layer structure 164, and the second laminated layer structure 164 preferably includes a plurality of laminations, nine being deposited in the preferred embodiment.

Following the deposition of the second laminated structure 164, a third laminated structure 174 is deposited that includes a plurality of laminated layers in which each layer is comprised of an Fe(N) sublayer 176 and an NiFe(N) sublayer 178. Significantly, in this third laminated structure 174, the thickness of the NiFe(N) sublayers 178 is reduced relative to the thickness of the NiFe(N) sublayers 168 in the second laminated structure 164, and the thickness of the Fe(N) sublayers 176 in the third laminated structure 174 is increased relative to the thickness of the Fe(N) sublayers 166 in the second laminated structure 164. As depicted in FIG. 4, in the preferred embodiment, the NiFe(N) sublayer 178 thickness is 400 Å and the Fe(N) sublayer 176 thickness is 400 Å in each lamination of the third laminated layer structure 174, and the third laminated layer structure 174 preferably includes a plurality of laminations, nine being preferred.

Following the deposition of the third laminated structure 174, a fourth laminated structure 184 is deposited that includes a plurality of laminated layers in which each layer is comprised of an Fe(N) sublayer 186 and an NiFe(N) sublayer 188. Significantly, in this fourth laminated structure, the thickness of the NiFe(N) sublayers 188 is reduced relative to the thickness of the NiFe(N) sublayers 178 in the third laminated structure 174, and the thickness of the Fe(N) sublayers 186 in the fourth laminated structure 184 is increased relative to the thickness of the Fe(N) sublayers 176 in the third laminated structure 174. As depicted in FIG. 4, in the preferred embodiment, the NiFe(N) sublayer 188 thickness is 300 Å and the Fe(N) sublayer 186 thickness is 500 Å in each lamination of the fourth laminated layer structure 184, and the fourth laminated layer structure 184 preferably includes a plurality of laminations, nine being preferred.

Following the deposition of the fourth laminated structure 184, a fifth laminated structure 194 is deposited that includes a plurality of laminated layers in which each layer is comprised of an Fe(N) sublayer 196 and an NiFe(N) sublayer 198. Significantly, in this fifth laminated structure 194, the thickness of the NiFe(N) sublayers 198 is reduced relative to the thickness of the NiFe(N) sublayers 188 in the fourth laminated structure 184, and the thickness of the Fe(N) sublayers 196 in the fifth laminated structure 194 is increased relative to the thickness of the Fe(N) sublayers 186 in the fourth laminated structure 184. As depicted in FIG. 4, in the preferred embodiment, the NiFe(N) sublayer 198 thickness is 200 Å and the Fe(N) sublayer 196 thickness is 600 Å in each lamination of the fifth laminated layer structure 194, and the fifth laminated layer structure 194 preferably includes a plurality of laminations, eight being preferred.

An analysis of the laminated structure of the layer 130 depicted in FIG. 4 and described in detail hereabove, reveals that a composition gradient is achieved in the present invention by the gradual change of the relative composition of the NiFe(N) sublayer thickness and the Fe(N) sublayer thickness. It is seen (see FIG. 3) that when the layer 130 is deposited as the S2 shield, that the NiFe(N) sublayer thickness 158 is greater proximate the MR sensor element side of the S2(P1) layer 130, and the Fe(N) sublayer thickness 196 is greater at the upper side of the S2 layer 130 proximate the write head side of the layer 130. Thus the relative composition of the various layers throughout the S2 layer 130 is purposely formed with a gradient, and this composition gradient results in improved performance characteristics for the read heads 74 and the write heads 78 of the tape head 14 of the present invention.

With regard to the S2(P1) layer 130 performance as a magnetic shield 132 proximate the MR sensor element 124, the increased relative concentration of NiFe(N) closest to the MR sensor element 124 provides enhanced magnetic shield properties, such as low magnetostriction and high corrosion resistance, as compared to Fe(N), as is known to those skilled in the art. However, NiFe(N) is a ductile substance and it is known to have an unwanted bridging problem. That is, when the tape head 14 is polished, and also when the head wears during usage, the NiFe(N) can tend to bridge across the insulation layer 128 to contact the MR sensor element 124 and cause electrical shorts that significantly degrade the performance of the read heads 74. Fe(N) is a significantly harder substance which provides increased wear resistance, and the presence of the Fe(N) sublayer 156 inhibits the bridging of the NiFe(N) sublayer 158, which reduces the electrical shorting problem. However, Fe(N) is susceptible to corrosion, and the relatively thin Fe(N) layer 156 at the MR sensor element side of the layer 130 provides a minimal corrosion problem with a counterbalancing smearing prevention property.

At the upper side of the S2(P1) layer 130, the layers with a relatively increased concentration of Fe(N) provide increased magnetic field properties, such as higher magnetostriction and magnetic moment density, that are desirable for a P1 magnetic pole 136 of a write head 78. The presence of some NiFe(N) 198 is desirable to inhibit corrosion as well as provide magnetic field properties that are also desirable in the P1 magnetic pole 136 of the write head 78.

The gradient composition of the S2(P1) layer 130 is not to be limited to that depicted in FIG. 4, and the present invention includes other gradients and layer relative compositions that generally provide a compositional gradient throughout the thickness of the S2(P1) layer 130. For instance, while FIG. 4 shows each of the laminated layer structures include a plurality of identical repetitions of the composition of each layer 154, 164, 174, 184 and 194 (such as nine times), it is within the scope of the present invention to vary the composition of the sublayers with each laminated structure. That is, for instance with regard to the first laminated layer structure 154, a first laminated layer might have an Fe(N) sublayer 156 thickness of 200 Å and a second laminated layer might have a Fe(N) sublayer 156 thickness of 210 Å, and a third laminated layer might have an Fe(N) sublayer 156 thickness of 220 Å, and so on, with a corresponding reduction in the thickness of the NiFe(N) sublayer 158 in each lamination, i.e., 600 Å, 590 Å, 580 Å, etc.

As an example of the performance improvement of the tape head 14 of the present invention, Table 1 herebelow provides data that compares a tape head 14 having a gradient composition laminated S2(P1) layer 130 of the present invention with a prior art tape head having an S2(P1) layer in which each laminated layer consists of an Fe(N) 600 Å sublayer and an NiFe(N) 200 Å sublayer, where 44 laminations of this laminated layer are deposited to create the S2(P1) layer of the prior art. It can be seen that the total thickness of the S2(P1) layer 130 of the present invention and of the prior art are practically equal, whereas the performance characteristics of the tape head 14 of the present invention are superior to those of the prior art tape head.

TABLE 1

| | Gradient Composition S2/P1 Layer | Prior Art NiFe(N) 200 Å, Fe(N) 600 Å |
|---|---|---|
| S2/P1 layer thickness (micron) | 3.49 | 3.5 |
| magnetization (kG) | 15 | 16.5 |
| Hc easy (Oe) | 0.7 | 1.0 |
| Hc hard (Oe) | 0.5 | 0.7 |
| Hk | 7.27 | 7 (approx) |
| permeability | 2060 | 2300 |
| resistivity (micro ohm-cm) | 26.3 | 42 |

Figure 5:
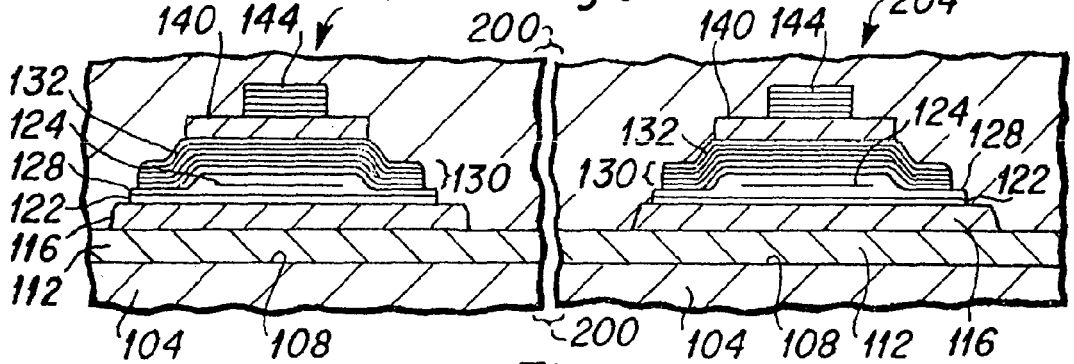
FIG. 5 depicts a merged magnetic head that may be used in a tape drive or hard disk drive of the present invention.

As indicated above, the graded laminated layer structure 130 of the present invention has application in other types of magnetic head designs, and FIG. 5 depicts a side cross-sectional view depicting a portion of a tape head sensor strip 200 that is similar to that depicted in FIG. 3. As depicted in FIG. 5, the sensor strip 200 includes two identical sensor elements 204 that each include a read head element and a write head element that is fabricated substantially identically to those depicted in FIG. 3 and described hereabove. Initially, an insulation layer 112, typically composed of $AL_2O_3$, is deposited across the surface 108 of a substrate 104. Thereafter, a discrete read head first shield (S1) 116 is fabricated upon the insulation layer 112 at each location. The S1 shield 116 may be comprised of a material such as AlFeSi, that is well known to those skilled in the art. Alternatively, the S1 shield can be comprised of a graded laminated layer of the present invention in which the composition of the laminated layer is reversed. That is, the higher concentration Fe(N) laminations are deposited first, and the higher concentration NiFe(N) laminations are deposited last, such that they are closest to the MR sensor element 124. Following the fabrication of the S1 shield 116, an electrical insulation layer (G1) 122 is deposited, followed by the fabrication of a MR sensor element 124 in a plurality of well known fabrication steps. Following the fabrication of the MR sensor element another electrical insulation layer (G2) 128 is deposited. Thereafter, a second magnetic shield (S2) 132 that is comprised of a graded laminated layer 130, is fabricated upon the G2 insulation layer 128. At this point, a read element structure similar to read element 74 depicted in FIG. 3 has been fabricated in each of the two sensor locations depicted in FIG. 5.

A write element structure is next fabricated upon the S2 shield 132. One well known method for fabricating a write element upon a read element is termed a merged magnetic head, in which the S2 shield 132 is also utilized as the first magnetic pole (P1) of the write element, and FIG. 5 depicts such a merged magnetic head. Therefore, following the fabrication of the S2 shield 132, which also serves as the P1 magnetic pole, a write gap layer 140, which is typically comprised of $AL_2O_3$, is deposited. Following the fabrication of the write gap layer, a write head induction coil structure (not shown) is fabricated. Thereafter, the second magnetic pole (P2) 144 is fabricated over the induction coil structure, such that the pole tip of the P2 pole 144 is deposited upon the write gap layer 140. In an alternative embodiment of the present invention, the P2 pole may also fabricated as a graded laminated structure similar to the graded laminated structure 130 depicted in FIG. 4. However, the composition of the laminations in the P2 pole may be advantageously reversed from that depicted in FIG. 4.

With regard to the merged magnetic head depicted in FIG. 5, it is to be understood that the graded laminated S2 pole 132 functions with the same advantages as was described hereabove with regard to the sensor elements depicted in FIG. 3. That is, the lower portion 154 of the S2 shield 130 that is closest to the MR element is advantageously comprised of predominantly NiFe(N) laminated layers, and the upper portion 194 of the S2 shield that is located proximate the write gap layer 140 is comprised predominantly Fe(N) laminated layers. As a result, the graded laminated S2 shield 132 functions as both an improved S2 shield of the read element and an improved P1 magnetic pole of the write element. Additionally, where the P2 pole 144 is fabricated as a graded laminated structure, the lower portion of the P2 pole that is closest to the write gap layer 140 is advantageously comprised of layers 194 having a high Fe(N) composition, and the laminations 154 of the P2 pole that are located away from the write gap layer are comprised of laminations containing a high concentration of NiFe(N).

A further magnetic head design, 220 is depicted in FIG. 6. It is termed a piggy back head by those skilled in the art and it may be fabricated to advantageously utilize the graded laminated layer structure of the present invention. Particularly, in comparing the piggy back head 220 of FIG. 6 with the merged head 220 of FIG. 5, it is seen that the significant difference between the two magnetic head designs is that the piggy back head 220 includes a P1 pole 224 that is separated by an insulation layer 228 from the S2 shield 132; whereas, in the merged head of FIG. 5 the S2 shield and P1 pole are the same graded laminated structure 132. Therefore, as depicted in FIG. 6, a read head element is fabricated with structures numbered identically to those depicted in FIG. 5 through the fabrication of the S2 shield 132. Thereafter, an insulation layer 228 is deposited upon the S2 shield 132 and a P1 magnetic pole 224 is next fabricated upon the insulation layer 228. The P1 pole 224 is advantageously fabricated as a graded laminated layer 130 that is substantially identical to the graded laminated layer of the S2 shield, such that the upper portions 194 of the graded laminated P1 pole 224 include layers that have a high Fe(N) concentration. Thereafter, a write gap layer 140 is deposited upon the P1 pole 224 and induction coil structures and a P2 pole 144 are subsequently fabricated. As indicated hereabove with regard to the merged magnetic head of FIG. 5, the P2 pole 144 may advantageously be fabricated as a graded laminated structure in which the laminations 194 closest to the write gap layer 140 have a higher Fe(N) concentration.

As will be understood by those skilled in the art, the graded shield and pole layer structure of the present invention can be comprised of materials other than Fe(N) and NiFe(N). For example, the layers may be composed of Fe and CZT (cobalt, zirconium, tantalum). Additionally, a graduated composition layer can be fabricated in which the composition of N in the Fe(N) and NiFe(N) layers is altered. These alternatives are meant to be included within the generalized concept of a graduated composition shield or pole structure described and claimed herein.

As will be well understood by those skilled in the art, a piggy back magnetic head as depicted in FIG. 6, and a merged magnetic head as depicted in FIG. 5 may be advantageously utilized as magnetic heads for a hard disk drive, and FIG. 7 is a schematic top plan view of a hard disk drive 250 including a magnetic head 254 of the present invention. As depicted therein, at least one hard disk 260 is rotatably mounted upon a motorized spindle 264. An actuator arm 268 is pivotally mounted within the hard disk drive 250 with a magnetic head of the present invention 254 disposed upon a distal end 272 of each actuator arm 268. A typical hard disk drive may include a plurality of disks 260 that are rotatably mounted upon the spindle 264 and a plurality of actuator arms 268 having a magnetic head mounted upon the distal end 272 of each of the actuator arms. As is well known to those skilled in the art, when the hard disk drive is operated, the hard disk 260 rotates upon the spindle and the magnetic head 254 acts as an air bearing slider that is adapted for flying above the surface of the rotating disk. The slider includes a substrate base upon which the various layers and structures that form the magnetic head 254 are fabricated.

While the present invention has been shown and described with regard to certain preferred embodiments, it will be understood that those skilled in the art will no doubt develop certain alterations and modifications thereto which nevertheless include the true spirit and scope of the invention. It is therefore intended that the following claims cover all such alterations and modifications.

What I claim is:

1. A method for fabricating a magnetic head, comprising the steps of:
    fabricating a read head upon a substrate surface, said read head including a first magnetic shield and a sensor element; and
    fabricating a second magnetic shield above said sensor element, including the steps of:
    depositing a first laminated structure including a plurality of layers, wherein each said layer includes a sublayer having a thickness of a low magnetostrictive material and a sublayer having a thickness of a high magnetostrictive material, and wherein said low magnetostriction material sublayer is thicker than said high magnetostriction material sublayer; and
    depositing a further laminated structure including a plurality of layers, wherein each said layer includes a sublayer having a thickness of a low magnetostrictive material and a sublayer having a thickness of a high magnetostrictive material, and wherein said low magnetostrictive material sublayer is thinner than said high magnetostrictive material sublayer.

2. The method for fabricating a magnetic head as described in claim 1 including the further steps of fabricating a middle laminated structure between said first laminated structure and said further laminated structure; said middle laminated structure including a plurality of layers wherein each said layer includes a sublayer of low magnetostrictive material and a sublayer of high magnetostrictive material, and wherein the thickness of each said sublayer is approximately equal.

3. The method for fabricating a magnetic head as described in claim 1 wherein each said layer is comprised of a NiFe(N) sublayer and a Fe(N) sublayer.

4. The method for fabricating a magnetic head as described in claim 1 wherein said low magnetostriction material is NiFe(N).

5. The method for fabricating a magnetic head as described in claim 1 wherein said high magnetostriction material is Fe(N).

6. The method for fabricating a magnetic head as described in claim 2 wherein each said layer is comprised of a NiFe(N) sublayer and a Fe(N) sublayer.

7. The method for fabricating a magnetic head as described in claim 2 wherein said low magnetostriction material is NiFe(N).

8. The method for fabricating a magnetic head as described in claim 2 wherein said high magnetostriction material is Fe(N).

9. A method for fabricating a magnetic head, comprising the steps of:
  fabricating a read head upon a substrate surface, said read head including a first magnetic shield and a sensor element; and
  fabricating a second magnetic shield above said sensor element, including a step of:
  depositing a laminated structure including a plurality of layers, wherein each said layer is comprised of a NiFe(N) sublayer and a Fe(N) sublayer, and wherein said layers that are disposed closest to said sensor element include a thicker sublayer of NiFe(N) and a thinner sublayer of Fe(N), and said layers that are disposed farthest from said sensor element include a thinner sublayer of NiFe(N) and a thicker sublayer of Fe(N).

10. A method for fabricating a magnetic head as described in claim 9 wherein said laminated structure includes middle layers wherein a NiFe(N) sublayer of the middle layers has a thickness that is approximately equal to a thickness of a Fe(N) sublayer of the middle layers.

11. A method for fabricating a magnetic head as described in claim 9 wherein said plurality of layers includes several layers wherein a thickness of said NiFe(N) sublayers is greater than a thickness of said Fe(N) sublayers, and several layers wherein a thickness of said NiFe(N) sublayers is approximately equal to a thickness of said Fe(N) sublayers, and several layers wherein a thickness of said NiFe(N) sublayers is less than a thickness of said Fe(N) sublayers.

12. A method for fabricating a magnetic head, comprising the steps of:
  fabricating a read head upon a substrate surface, said read head including a first magnetic shield and a sensor element; and
  fabricating a second magnetic shield above said sensor element, including a step of:
  depositing a laminated structure including a plurality of layers, wherein said laminated structure includes:
  a first laminated substructure being comprised of a plurality of layers wherein each layer includes a sublayer of NiFe(N) having a thickness of approximately 600 Å and a sublayer of Fe(N) having a thickness of approximately 200 Å;
  a second laminated substructure being comprised of a plurality of layers wherein each said layer includes a NiFe(N) sublayer having a thickness of approximately 500 Å and a Fe(N) sublayer having a thickness of approximately 300 Å;
  a third laminated substructure being comprised of a plurality of layers, wherein each said layer includes a NiFe(N) sublayer having a thickness of approximately 400 Å and a Fe(N) sublayer having a thickness of approximately 400 Å;
  a fourth laminated substructure being comprised of a plurality of layers, wherein each said layer includes a NiFe(N) sublayer having a thickness of approximately 300 Å and a Fe(N) sublayer having a thickness of approximately 500 Å; and
  a fifth laminated substructure being comprised of a plurality of layers, wherein each said layer includes a NiFe(N) sublayer having a thickness of approximately 200 Å and a Fe(N) sublayer having a thickness of approximately 600 Å.

* * * * *